United States Patent
Duvalsaint et al.

(10) Patent No.: US 9,824,008 B2
(45) Date of Patent: *Nov. 21, 2017

(54) CACHE MEMORY SHARING IN A MULTI-CORE PROCESSOR (MCP)

(75) Inventors: Karl J. Duvalsaint, Lagrangeville, NY (US); Daeik Kim, White Plains, NY (US); Moon J. Kim, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 519 days.

This patent is subject to a terminal disclaimer.

(21) Appl. No.: 12/275,552

(22) Filed: Nov. 21, 2008

(65) Prior Publication Data

US 2010/0131716 A1     May 27, 2010

(51) Int. Cl.
*G06F 12/08*     (2016.01)
*G06F 12/0811*     (2016.01)
(Continued)

(52) U.S. Cl.
CPC ...... *G06F 12/0811* (2013.01); *G06F 11/1666* (2013.01); *G06F 12/0813* (2013.01);
(Continued)

(58) Field of Classification Search
CPC ............... G06F 12/084; G06F 12/0842; G06F 12/0846; G06F 12/0871
(Continued)

(56) References Cited

U.S. PATENT DOCUMENTS

| 4,357,656 A | 11/1982 | Saltz et al. |
|---|---|---|
| 5,721,883 A | 2/1998 | Katsuo et al. |

(Continued)

FOREIGN PATENT DOCUMENTS

| CN | 1427340 A | 7/2003 |
|---|---|---|
| CN | 1474969 A | 2/2004 |

(Continued)

OTHER PUBLICATIONS

Ulrich Drepper, Memory part 2: CPU cacche, 2007, http://lwn.net/Articles/252125/.*

(Continued)

*Primary Examiner* — David X Yi
*Assistant Examiner* — Ramon A Mercado
(74) *Attorney, Agent, or Firm* — William H. Hartwell; Madeline F. Schiesser; Keohane & D'Alessandro PLLC

(57) ABSTRACT

This invention describes an apparatus, computer architecture, memory structure, memory control, and cache memory operation method for multi-core processor. A logic core shares requests when faced with immediate cache memory units having low yield or deadly performance. The core mounts (multiple) cache unit(s) that might already be in use by other logic cores. Selected cache memory units serve multiple logic cores with the same contents. The shared cache memory unit(s) serves all the mounting cores with cache search, hit, miss, and write back functions. The method recovers a logic core whose cache memory block is not operational by sharing cache memory blocks which might already engage other logic cores. The method is used to improve reliability and performance of the remaining system.

20 Claims, 3 Drawing Sheets

(51) Int. Cl.
*G06F 11/16* (2006.01)
*G06F 12/0813* (2016.01)
G06F 11/20 (2006.01)
G06F 12/084 (2016.01)
G06F 12/0888 (2016.01)

(52) U.S. Cl.
CPC ...... *G06F 11/2035* (2013.01); *G06F 11/2043* (2013.01); *G06F 12/084* (2013.01); *G06F 12/0888* (2013.01); *G06F 2212/1032* (2013.01)

(58) Field of Classification Search
USPC .......................... 711/130, 118, 148; 709/213
See application file for complete search history.

(56) References Cited

U.S. PATENT DOCUMENTS

| | | | |
|---|---|---|---|
| 5,821,769 A | 10/1998 | Douseki | |
| 5,838,047 A | 11/1998 | Yamanchi et al. | |
| 6,000,007 A * | 12/1999 | Leung et al. | 711/105 |
| 6,038,644 A | 3/2000 | Irie et al. | |
| 6,138,208 A | 10/2000 | Dhong et al. | |
| 6,215,898 B1 | 4/2001 | Woodfill et al. | |
| 6,289,438 B1 * | 9/2001 | Takayanagi | 712/218 |
| 6,404,239 B1 | 6/2002 | Kawahara et al. | |
| 6,404,902 B1 | 6/2002 | Takano et al. | |
| 6,456,737 B1 | 9/2002 | Woodfill et al. | |
| 6,535,433 B2 | 3/2003 | Ooishi | |
| 6,567,622 B2 | 5/2003 | Phillips | |
| 6,651,145 B1 | 11/2003 | Jamil et al. | |
| 6,661,931 B1 | 12/2003 | Kawada | |
| 6,744,931 B2 | 6/2004 | Komiya et al. | |
| 6,829,378 B2 | 12/2004 | DiFilippo et al. | |
| 6,922,783 B2 | 7/2005 | Knee et al. | |
| 7,028,196 B2 | 4/2006 | Soltis, Jr. et al. | |
| 7,039,818 B2 | 5/2006 | Deng et al. | |
| 7,080,267 B2 | 7/2006 | Gary et al. | |
| 7,095,882 B2 | 8/2006 | Akahori | |
| 7,102,777 B2 | 9/2006 | Haraguchi | |
| 7,142,725 B2 | 11/2006 | Komiya et al. | |
| 7,168,070 B2 | 1/2007 | Archambault et al. | |
| 7,240,160 B1 * | 7/2007 | Hetherington et al. | 711/122 |
| 7,260,677 B1 * | 8/2007 | Vartti et al. | 711/112 |
| 7,418,368 B2 | 8/2008 | Kim et al. | |
| 7,436,205 B2 | 10/2008 | Tada | |
| 7,521,762 B2 | 4/2009 | Nidaka | |
| 7,531,994 B2 | 5/2009 | Itoh | |
| 7,685,354 B1 * | 3/2010 | Hetherington et al. | 711/5 |
| 7,804,329 B2 | 9/2010 | Cho et al. | |
| 8,082,397 B1 | 12/2011 | Ezra et al. | |
| 8,806,129 B2 * | 8/2014 | Duvalsaint | G06F 12/0811 709/213 |
| 9,122,617 B2 * | 9/2015 | Duvalsaint | G06F 12/0897 |
| 2002/0129208 A1 | 9/2002 | Barroso et al. | |
| 2003/0080782 A1 | 5/2003 | Bailey et al. | |
| 2003/0114205 A1 | 6/2003 | Yamashita | |
| 2004/0059875 A1 * | 3/2004 | Garg et al. | 711/141 |
| 2004/0210795 A1 | 10/2004 | Anderson | |
| 2005/0034002 A1 | 2/2005 | Flautner | |
| 2005/0083338 A1 | 4/2005 | Yun et al. | |
| 2005/0144223 A1 | 6/2005 | Yang et al. | |
| 2005/0263678 A1 | 12/2005 | Arakawa | |
| 2005/0268039 A1 | 12/2005 | Archambault et al. | |
| 2005/0289365 A1 | 12/2005 | Bhandarkar | |
| 2006/0013473 A1 | 1/2006 | Woodfill et al. | |
| 2006/0015772 A1 * | 1/2006 | Ang et al. | 714/7 |
| 2006/0022742 A1 | 2/2006 | Parris et al. | |
| 2006/0154130 A1 * | 7/2006 | Hood et al. | 429/34 |
| 2006/0250514 A1 | 11/2006 | Inoue et al. | |
| 2006/0268357 A1 | 11/2006 | Vook et al. | |
| 2007/0159642 A1 | 7/2007 | Choi | |
| 2008/0015772 A1 | 1/2008 | Sanme et al. | |
| 2008/0084775 A1 | 4/2008 | Hoberman et al. | |
| 2008/0122479 A1 | 5/2008 | Hideto | |
| 2010/0127730 A1 | 5/2010 | Cho et al. | |
| 2010/0131712 A1 | 5/2010 | Duvalsaint et al. | |
| 2010/0131713 A1 | 5/2010 | Duvalsaint et al. | |
| 2010/0131717 A1 | 5/2010 | Duvalsaint et al. | |

FOREIGN PATENT DOCUMENTS

| | | |
|---|---|---|
| CN | 1871587 A | 11/2006 |
| EP | 1662389 A2 | 5/2006 |
| EP | 1863177 A2 | 12/2007 |
| WO | 95/25306 A2 | 9/1995 |

OTHER PUBLICATIONS

Manu Thapar, Bruce Delagi, and Michael J. Flynn. 1991. Scalable Cache Coherence for Shared Memory Multiprocessors. In Proceedings of the First International ACPC Conference on Parallel Computation, Hans P. Zima (Ed.). Springer-Verlag, London, UK, UK, 1-12.*
Levacq, D. et al., Backgate Bias Accelerator for 10ns-order Sleep-to-Active Modes Transition time, IEEE Asian Solid-State Circuits Conference, Nov. 2007, pp. 296-299.
Kim, K. et al., "Back-Gate Controlled Wide Tunable Range Diode Voltage in Asymmetrical Double-Gate Devices", IEEE International SOI Conference Proceedings, Oct. 2006, pp. 151-152.
Makino, H. et al., "An Auto-Backgate-Controlled MT-CMOS Circuit", 1998 Symposium on VLSI Circuits Digest of Technical Papers, Jun. 1998, pp. 42-43.
Notice of Allowance dated May 21, 2010 for U.S. Appl. No. 12/275,521, filed Nov. 21, 2008.
Prosecution History for U.S. Appl. No. 12/275,508.
Prosecution History for U.S. Appl. No. 12/276,069.
Prosecution History for U.S. Appl. No. 12/276,072.
Prosecution History for U.S. Appl. No. 12/275,521.
Information Materials for IDS dated Jun. 22, 2011.
Information Materials for IDS.
Bibliographic Data for CN1474969(A) with English Abstract.
Bibliographic Data for CN1871587(A) with English Abstract.
Bibliographic Data for CN1427340(A) with English Abstract.
U.S. Appl. No. 12/275,508, Office Action, May 23, 2013, 21 pages.
U.S. Appl. No. 12/275,508, Notice of Allowance, dated Mar. 28, 2014, 41 pages.
U.S. Appl. No. 12/276,069, Office Action, dated Mar. 21, 2013, 31 pages.
U.S. Appl. No. 12/276,069, Office Action, dated Mar. 26, 2014, 13 pages.
U.S. Appl. No. 12/276,072, Office Action, dated Jun. 4, 2013, 29 pages.
U.S. Appl. No. 12/276,072, Office Action, dated Jun. 19, 2014, 13 pages.
U.S. Appl. No. 12/275,521, Notice of Allowance, dated May 21, 2010, 12 pages.
Thapar et al., "Scalable Cache Coherence for Shared Memory Multiporcessors", Mar. 27, 2014, 12 pages.
U.S. Appl. No. 12/276,072, Office Action, dated Nov. 21, 2012, 17 pages.
Sohi, "Cache memory organization to enhance the yield of high performance VLSI processors", Computers, IEEE, Transaction on, vol. 38, No. 4, pp. 484-492, Apr. 1989.
U.S. Appl. No. 12/275,508, Office Action, dated Sep. 7, 2012, 21 pages.
U.S. Appl. No. 12/276,069, Office Action, dated Sep. 11, 2014, 19 pages.
U.S. Appl. No. 12/276,069, Final Office Action, dated Jan. 14, 2015, 14 pages.
U.S. Appl. No. 12/276,069, Notice of Allowance, dated Apr. 29, 2015, 12 pages.
U.S. Appl. No. 12/276,069, Office Action, dated Mar. 14, 2011, 23 pages.
U.S. Appl. No. 12/276,069, Office Action, dated Nov. 28, 2012, 17 pages.
U.S. Appl. No. 12/275,508, Office Action, dated Mar. 29, 2011, 25 pages.

(56) References Cited

OTHER PUBLICATIONS

U.S. Appl. No. 12/275,508, Final Office Action, dated Jun. 10, 2011, 17 pages.
U.S. Appl. No. 12/276,072, Examiner's Answer, dated Nov. 3, 2014, 15 pages.
Mercado, Ramon, U.S. Appl. No. 12/276,072, Office Action, dated Dec. 13, 2016, 23 pgs.
Mercado, Ramon, U.S. Appl. No. 12/276,072, Final Office Action, dated Jun. 14, 2017, 42 pgs.
Mercado, Ramon, U.S. Appl. No. 12/276,072, Notice of Allowance, dated Sep. 25, 2017, 25 pgs.
Mercado, Ramon, U.S. Appl. No. 12/276,072, Office Action, dated Mar. 27, 2014, 44 pgs.

* cited by examiner

_US 9,824,008 B2_

CACHE MEMORY SHARING IN A MULTI-CORE PROCESSOR (MCP)

CROSS-REFERENCE TO RELATED APPLICATIONS

This application is related in some aspects to commonly owned and co-pending Ser. No. 12/275,521, entitled "Charge Transfer for Digital Circuits," filed Nov. 21, 2008, the entire contents of which are herein incorporated by reference. This application is also related in some aspects to commonly owned and co-pending Ser. No. 12/275,508, entitled "Mounted Cache Memory in a Multi-Core Processor (MCP)," filed Nov. 21, 2008, the entire contents of which are herein incorporated by reference. This application is also related in some aspects to commonly owned and co-pending Ser. No. 12/276,069, entitled "Pseudo Cache Memory in a Multi-Core Processor (MCP)," filed Nov. 21, 2008, the entire contents of which are herein incorporated by reference. This application is also related in some aspects to commonly owned and co-pending Ser. No. 12/276,072, entitled "Cache Memory Bypass in a Multi-Core Processor (MCP)," filed Nov. 21, 2008, the entire contents of which are herein incorporated by reference.

FIELD OF THE INVENTION

The preset invention generally relates to multi-core processors (MCP). Specifically, the present invention relates to the bypassing of low yield or dead cache memory units in a MCP.

BACKGROUND OF THE INVENTION

Multi-Core Processor (MCP) with hierarchical architecture is a trend for state-of-the-art digital system. Typically, MCPs are implemented with aggressively scaled nanometer CMOS technologies to have high device density and multi-core design. On the other hand, yield failure is caused by the process variability and defects in nanometer CMOS manufacturing. With the hierarchical architecture, a partial failure causes extensive damage to the components in the tree hierarchy and architecture. Therefore, system design and operation methods to salvage operational component blocks are essential to improve product yield as well as to increase the reliability.

SUMMARY OF THE INVENTION

This invention describes an apparatus, computer architecture, memory structure, memory control, and cache memory operation method for multi-core processor. A logic core shares requests when faced with immediate cache memory units having low yield or deadly performance. The core mounts (multiple) cache unit(s) that might already be in use by other logic cores. Selected cache memory units serve multiple logic cores with the same contents. The shared cache memory unit(s) serves all the mounting cores with cache search, hit, miss, and write back functions. The method recovers a logic core whose cache memory block is not operational by sharing cache memory blocks which might already engage other logic cores. The method is used to improve reliability and performance of the remaining system.

A first aspect of the present invention provides a shared cache memory system, comprising: a first memory unit mounted on a bus; a first cache manager coupled to the first memory unit; and a second memory unit mounted on the bus, the first cache manager being operable to: receive a request, and share the request to the second memory unit.

A second aspect of the present invention provides a shared cache memory system, comprising: a first cache memory unit mounted on a bus; a first cache manager coupled to an input and an output of the first cache memory unit; a first set of sub-cache memory units coupled to the first cache manager; a second cache memory unit mounted on the bus; a second cache manager coupled to an input and an output of the second cache memory unit; and a second set of sub-cache memory units coupled to the second cache manager, the first cache manager and the second cache manager each being operable to: receive a request, share the request with different cache memory unit.

A third aspect of the present invention provides a cache memory sharing method, comprising: receiving a first request on a cache manager, the first cache manager being coupled to a first memory unit, the first memory unit being coupled to a bus; and sharing the request with a second memory unit by sending the request to a second cache manager, the second cache manager being coupled to the second memory unit, the second memory unit being coupled to the bus.

BRIEF DESCRIPTION OF THE DRAWINGS

These and other features of this invention will be more readily understood from the following detailed description of the various aspects of the invention taken in conjunction with the accompanying drawings in which.

Figure 1:
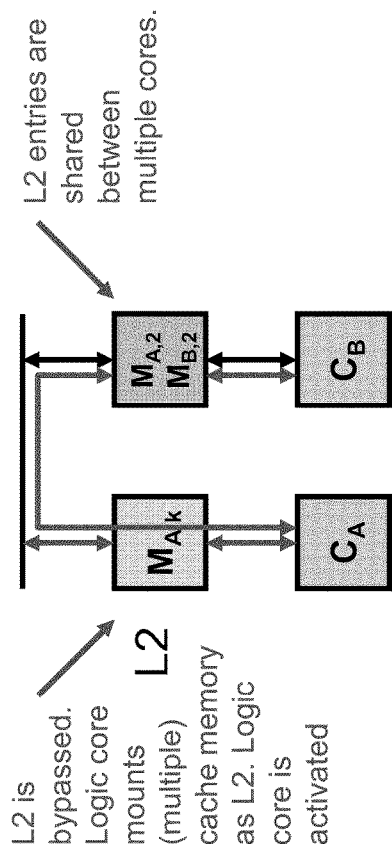
FIG. 1 depicts the comparison of shared cache memory system according to the present invention versus a conventional method.
Figure 1:
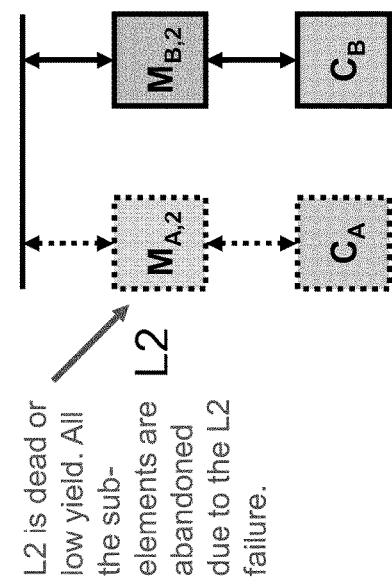

It should be understood that the drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:
I. General Description
II. Illustrative Example

I. General Description

As indicated above, this disclosure describes an apparatus, computer architecture, memory structure, memory control, and cache memory operation method for multi-core processor. Specifically, under the present invention an available on-chip memory is coupled to another logic core or memory (e.g., cache) unit using a set of cache managers. Specifically, each cache manager is coupled to the input and output of a cache memory unit. This allows the assigned memory to become an extension of the same level cache, next level cache memory, or memory buffer. This also allows recovers a memory block whose logic core is not operational, and is used to improve cache memory performance of the system. It should be understood in advance the teachings herein are typically applied to a Multi-Core Processor (MCP), although this need not be the case. In addition, it should be understood although this disclosure discusses memory units as being (virtual) cache or sub-cache memory units, this is only one example of the way in which in the teachings recited herein could be implemented. As such, it should be understood that these teachings could be implemented in conjunction with any type of memory now known or later developed.

Multi-Core Processors (MCPs) with hierarchical architectures are a trend for state-of-the-art digital system. Such implementations are typically implemented with aggressively scaled nanometer CMOS technologies to have high device density and multi-core design. On the other hand, yield failure is caused by the process variability and defects in nanometer CMOS manufacturing. With the hierarchical architecture, a partial failure causes extensive damage to the components in the tree hierarchy and architecture. The present invention improves the yield and the reliability of the MCP. This design includes architecture, memory structure, memory control, and cache memory operation method.

State-of-the-art digital systems employ a multi-core processor architecture. They are arranged hierarchically for efficient operation and computation management and design scalability. Since they assume that all the components in the hierarchy are sound, one slight failure would cause catastrophic failure of the remaining components in the tree architecture. The present invention addresses the case where a memory block is intact, but the logic components are damaged in the course of manufacturing, aging, and other reasons. In conventional designs, all the components in the hierarchy and tree are abandoned, which it results in very expensive losses in MCP products. The invention proposes to reuse the operational memory block, by mounting the memory to other functional blocks, such as digital logic core or other memory block. Moreover, the reuse of mounted cache memory units improves chip performance and resilience to manufacturing defects. The method can be applied to many different levels of on-chip cache memory.

FIG. 1 depicts the comparison of shared cache memory system according to the present invention versus a conventional method. Under the conventional method, when $M_{A2}$ is dead or producing low yield, all the sub-processing elements are abandoned due to the failure of $M_{A2}$. Conversely, under the present invention, when $M_{AK}$ is dead or producing low yield, $M_{Ak}$ is bypassed while allowing its sub-processing elements remain functional. In bypassing $M_{Ak}$, inbound requests will be redirected to $M_{A2}$ $M_{B2}$ via cache managers as described below.

Figure 2:
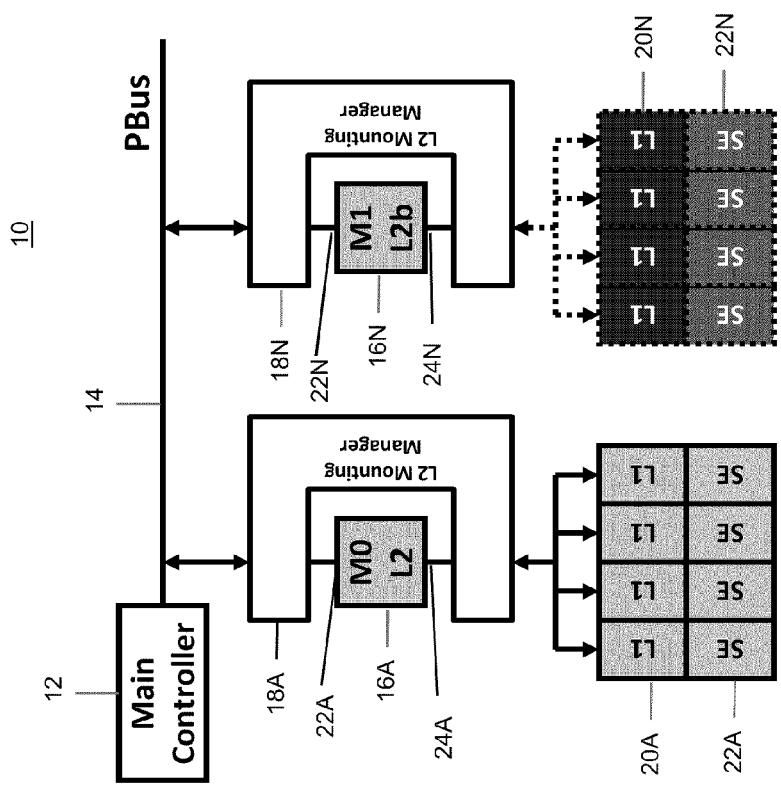
FIG. 2 depicts a cache memory bypass system according to the present invention.

Referring now to FIG. 2, a shared cache memory system 10 according to the present invention is shown. As depicted, system 10 includes a main controller 12, a bus 14, a set (at least one) of cache memory units 16A-N coupled to bus 14, a set (at least one) of sub-cache memory units 20A-N coupled to set of cache memory units 16A-N, and a set (at least one) of sub-processing elements 22A-N coupled to sub-cache memory units 20A-N. Also shown in FIG. 1 is a set of cache managers 18A-N. As depicted, each cache manager 18A-N is coupled to an input 24A-N and an output 26A-N of a cache memory unit 16A-N.

Cache managers 18A-N foster communication among the components of FIG. 1. By using cache managers both cache memory units 16A-N can be isolated from logic cores. In the of cache memory unit 16A, failing memory is isolated. In cache memory unit 16N, memory can be shared among different logic cores with the cache manager. One type of such communication is memory requests. This can be especially useful when one memory unit "misses" or fails to satisfy the request, another memory unit (vertically within the hierarchy or adjacent) can be so requested. The cache memory mounting operation is done by finding dead logic and live memory in the MCP. Any live memory block with dead logic core can be dedicated to another memory or logic core, as a cache or a memory buffer. It does not have to be one-to-one relationship. A main controller at the top hierarchy manages mounting process, by performing diagnosis on memories and cores. Cache manager receives (1) normal cache, (2) mounting or (3) being mounted instructions from the main controller. Main controller 12 communicates with cache managers 18A-N through bus 14. Cache managers 18A-N remember their status, and performs following cache operation steps: wrapping cache memory unit input and output; configuring cache memory unit bypassing; configuring cache mounting information; and arranging cache input and output for sharing.

II. Illustrative Example

Figure 3:
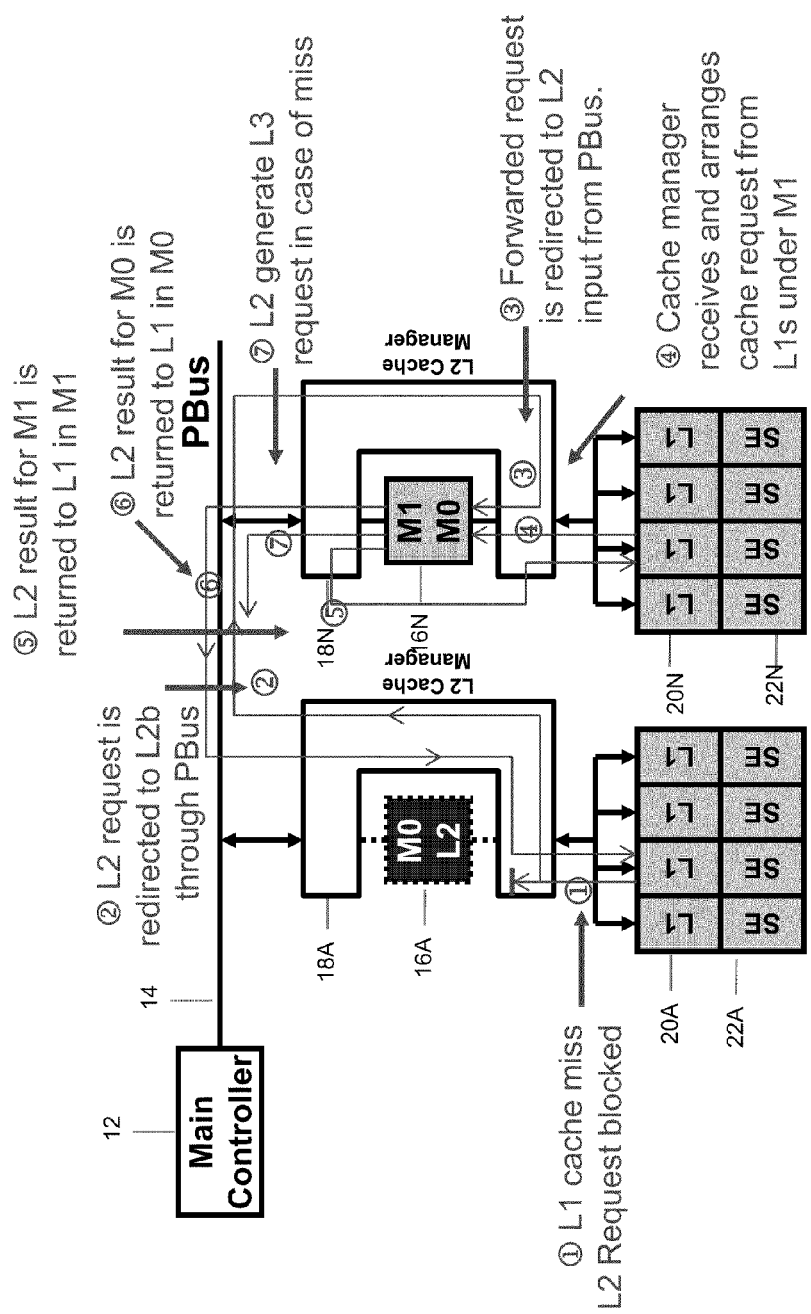
FIG. 3 depicts a progression of events involved with processing requests using the cache memory bypass system of FIG. 1 according to one example of the present invention.

FIG. 3 shows a progression of events for such an example. In this example, it is assumed that cache memory unit 16A is inoperable. In step 1, sub-processing element 22A sends a request to sub-cache memory unit 20A for memory content. Sub-cache memory unit 20A cannot fulfill the request (i.e., a cache miss). Sub-cache memory unit 20A then generates a request (e.g., intended for cache memory unit 16A) that cache manager 18A redirects to cache memory unit 16N bypassing cache memory unit 16A entirely. In step 2, cache manager 18A performs this bypass/redirection via bus 14. In step 3, receiver-side cache manager 18N redirects the incoming request to the input of cache memory unit 16N. In step 4, sub-processing elements 22N under cache memory unit 16N also make a search in an attempt to fulfill the request, followed by cache memory unit 16N's search, in case of a cache miss. Cache manager 18N arranges incoming cache requests from M0 and M1. In step 5, results are returned to cache manager 18N. In step 6, responses are sent back to cache manager 18N. If there is a hit, the process can end. If not, a request can be issued via cache manager 18N to a third cache memory unit (not shown) in step 7. Such a request will be received by that cache memory unit's cache manager. If that receiving cache memory unit is dead or producing low yields, the request can be redirected in a manner similar to step 2.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A shared cache memory system, comprising:
a main controller;
a first memory unit mounted on a bus;
a first cache manager coupled to the first memory unit;
a first set of sub-memory units coupled to the first cache manager;
a first set of sub-processing elements coupled to the first set of sub-memory units; and a second cache manager coupled to an input and an output of a second memory unit mounted on the bus, the first cache manager:
  receiving instructions to mount the first set of sub-memory units to the second memory unit, responsive to a diagnosis on the first memory unit by the main controller, from the main controller in response to a cache miss at the first set of sub-memory units;
  receiving a request for memory content originating from the first set of sub-processing elements;
  isolating the first memory unit from the first set of sub-memory units and the first set of sub-processing elements by:
    wrapping an input and an output of the first memory unit;
    bypassing the first memory unit;
    configuring mounting of the first cache manager based on the received mounting instructions; and
    arranging the input and the output of the first memory unit to allow sharing to the second memory unit of requests made to the first memory unit; and
  sharing the request for memory content to the input of the second memory unit via the second cache manager to enable the second memory unit to function as a next-level higher cache to the first memory unit in the case that the first set of sub-memory units experience a cache miss, the first memory unit exhibits a yield below a predetermined threshold, and the first set of sub-memory units and the first set of sub-processing elements are operational,
  wherein the main controller is coupled at a top of a hierarchy on the bus and in communication with the first and second cache managers and the second cache manager directs the request to the input of the second memory unit to enable a search of the second memory unit and a second set of sub-memory units coupled to the second memory unit.

2. The shared cache memory system of claim 1, the first memory unit and the second memory unit comprising virtualized cache memory units.

3. The shared cache memory system of claim 1, the second cache manager being further operable to receive an additional request, and share the additional request to at least one of the following: the first memory unit; or a third memory unit.

4. The shared cache memory system of claim 1, a second set of sub-processing elements being coupled to the second set of sub-memory units.

5. The shared cache memory system of claim 1, the bus being coupled to the main controller.

6. The shared cache memory system of claim 1, the first cache manager further sharing the request when the first memory unit is inoperable.

7. The shared cache memory system of claim 1, the first cache manager being coupled to an input and an output of the first memory unit.

8. A shared cache memory system, comprising:
  a first cache memory unit mounted on a bus;
  a first cache manager coupled to an input and an output of the first cache memory unit;
  a first set of sub-cache memory units coupled to the first cache manager;
  a second cache memory unit mounted on the bus;
  a second cache manager coupled to an input and an output of the second cache memory unit; and
  a second set of sub-cache memory units coupled to the second cache manager, the first cache manager:
    receiving instructions to mount the first set of sub-cache memory units to the second cache memory unit, responsive to a diagnosis on the first cache memory unit by a main controller, from the main controller in response to a cache miss at the first set of sub-cache memory units;
    receiving a request for memory content originating from a first set of sub-processing elements;
    isolating the first cache memory unit from the first set of sub-cache memory units by:
      wrapping an input and an output of the first cache memory unit;
      bypassing the first cache memory unit;
      configuring mounting of the first cache manager based on the received mounting instructions; and
      arranging the input and the output of the first cache memory unit to allow sharing to the second cache memory unit of requests made to the first cache memory unit; and
    sharing the request for memory content with the input of the second cache memory unit via the second cache manager to enable the second cache memory unit to function as a next-level higher cache to the first cache memory unit in the case that the first set of sub-cache memory units experience a cache miss, the first cache memory unit exhibits a yield below a predetermined threshold, and the first cache memory unit is coupled to an operational first set of sub-cache memory units,
    wherein the main controller is coupled at a top of a hierarchy on the bus and in communication with the first and second cache managers and the request is received from the second cache manager at an input of the second cache memory unit and the second set of sub-cache memory units.

9. The shared cache memory system of claim 8, further comprising a first set of sub-processing elements coupled to the first set of sub-cache memory units.

10. The shared cache memory system of claim 8, further comprising a second set of sub-processing elements coupled to the second set of sub-cache memory units.

11. The shared cache memory system of claim 8, the bus being coupled to the main controller.

12. A cache memory sharing method, comprising:
  receiving a first request on a first cache manager, the first cache manager being coupled to a first memory unit, the first memory unit being coupled to a bus;
  receiving instructions to mount a first set of sub-cache memory units to a second cache memory unit, responsive to a diagnosis on the first memory unit by a main controller, from the main controller in response to a cache miss at the first set of sub-memory units coupled to the first cache manager;
  isolating the first memory unit from the first set of sub-memory units by:
    wrapping an input and an output of the first memory unit;
    bypassing the first memory unit;
    configuring mounting of the first cache manager based on the received mounting instructions; and
    arranging the input and the output of the first memory unit to allow sharing to the second memory unit of requests made to the first memory unit; and
  sharing the request with the second memory unit by sending the request to a second cache manager in the case that a first set of sub-processing elements coupled to the first memory unit experiences a cache miss, the first memory unit exhibits a yield below a predetermined threshold, and the first set of sub-processing elements are operational, wherein the main controller is coupled at a top of a hierarchy on the bus and in communication with the first and second cache managers and the request is received from the second cache manager at an input of the second memory unit and a second set of sub-cache memory units, the second cache manager being coupled to the second memory unit, the second memory unit being coupled to the bus, and the bus being coupled to the main controller.

13. The cache memory sharing method of claim 12, the first request being received from the first set of sub-memory units coupled to the first memory unit.

14. The cache memory sharing method of claim 12, further comprising:
receiving a second request on the second cache manager; and
sharing the second request by sending the second request from the second cache manager to at least one of the following: the first cache manager; or a third cache manager.

15. The cache memory sharing method of claim 13, the second request being received from a second set of sub-memory units coupled to the second memory unit.

16. The cache memory sharing method of claim 15, the first memory unit, the first set of sub-memory units, the second memory unit, and the second set of sub-memory units being cache memory units.

17. The cache memory sharing method of claim 12, further comprising sending a response to the first request from the second memory unit to an originator of the request.

18. The cache memory sharing method of claim 17, the response being sent via the second cache manager.

19. The shared cache memory system of claim 1, the first and second cache managers having a status stored in a memory of the first and second cache managers.

20. The shared cache memory system of claim 1, the first cache manager performing the following cache operation steps: wrapping an input and an output of the first memory unit; configuring bypassing of the first memory unit; configuring mounting information for the first set of sub-memory units; and arranging input and output for the first set of sub-memory units for sharing.

* * * * *